United States Patent
Poppe et al.

(10) Patent No.: US 10,742,306 B1
(45) Date of Patent: Aug. 11, 2020

(54) SYSTEMS AND METHODS FOR CONTROLLING A NODE DEVICE

(71) Applicant: Verizon Patent and Licensing Inc., Arlington, VA (US)

(72) Inventors: Theodore G. Poppe, Flemington, NJ (US); Miguel A. Goncalves, Waltham, MA (US); James John Richards, Malden, MA (US); Kyle Brisson, Bloomfield, NJ (US); Michael Antony Raj, Basking Ridge, NJ (US); Paul Kerl, East Arlington, MA (US); Shawn A. Nuttall, Bloomfield, NJ (US); Michael D. Hanson, Braintree, MA (US)

(73) Assignee: Verizon Patent and Licensing, Inc., Basking Ridge, NJ (US)

( * ) Notice: Subject to any disclaimer, the term of this patent is extended or adjusted under 35 U.S.C. 154(b) by 0 days.

(21) Appl. No.: 16/518,469

(22) Filed: Jul. 22, 2019

(51) Int. Cl.
| | | |
|---|---|---|
| *H04B 7/14* | (2006.01) |
| *H04B 7/15* | (2006.01) |
| *H04B 7/155* | (2006.01) |
| *H04B 3/54* | (2006.01) |
| *G06K 9/00* | (2006.01) |
| *H04B 7/0413* | (2017.01) |
| *G06N 20/10* | (2019.01) |
| *H04B 7/026* | (2017.01) |

(52) U.S. Cl.
CPC ..... *H04B 7/15507* (2013.01); *G06K 9/00771* (2013.01); *G06N 20/10* (2019.01); *H04B 3/54* (2013.01); *H04B 7/026* (2013.01); *H04B 7/0413* (2013.01)

(58) Field of Classification Search
CPC ........ H04B 7/15507; H04B 7/15; H04B 7/14; H04B 3/54; H04B 9/00771; H04B 7/0413; H04B 7/026; G06N 20/10
See application file for complete search history.

(56) References Cited

U.S. PATENT DOCUMENTS

2003/0163831 A1* 8/2003 Gall ................. H04N 7/17309
725/127

\* cited by examiner

*Primary Examiner* — Dong-Chang Shiue

(57) ABSTRACT

A monitoring platform may obtain information concerning a location of a node device on a wire and information concerning a location of an antenna of a customer premises equipment (CPE). The monitoring platform may cause, based on the information concerning the location of the node device and the information concerning the location of the antenna of the CPE, the node device to move from a first node device position to a second node device position on the wire. The monitoring platform may cause the node device and the CPE to communicate via a communication link.

20 Claims, 12 Drawing Sheets

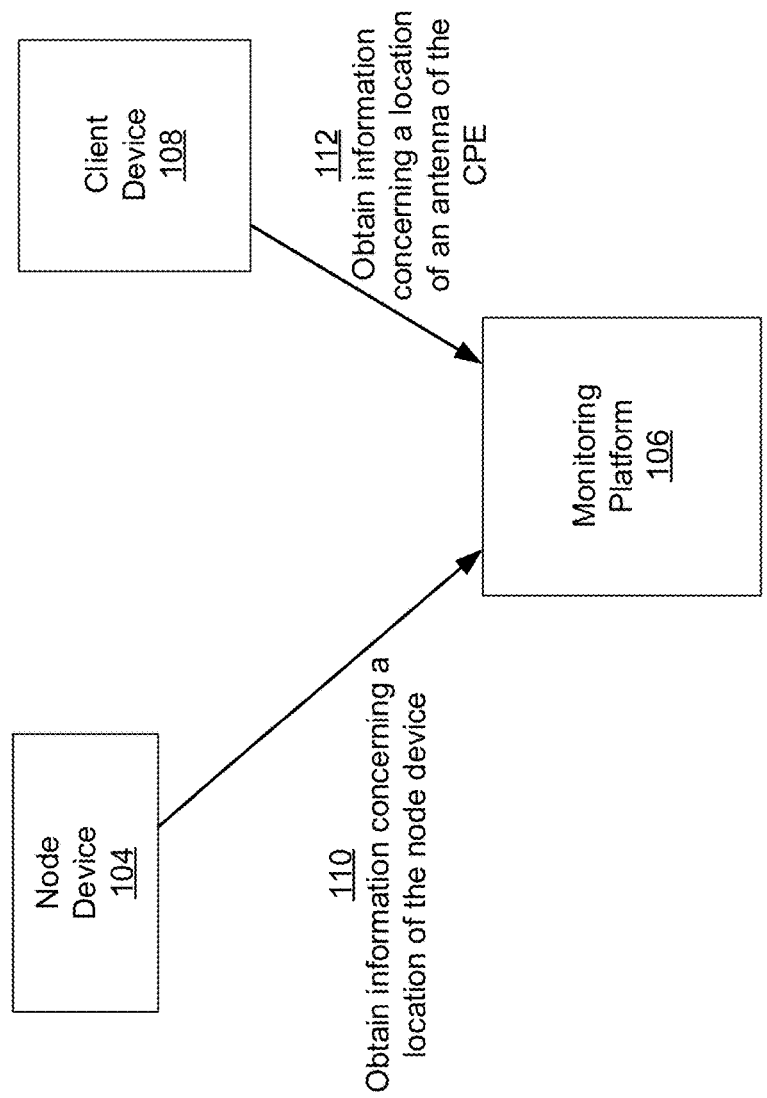

SYSTEMS AND METHODS FOR CONTROLLING A NODE DEVICE

BACKGROUND

A node device, such as a low-powered cellular radio access node may provide one or more devices with access to a network. The node device can be mounted to a structure, such as a utility pole, to provide an area of coverage that encompasses the one or more devices.

BRIEF DESCRIPTION OF THE DRAWINGS

FIGS. 1A-1G are diagrams of one or more example implementations described herein.

DETAILED DESCRIPTION OF PREFERRED EMBODIMENTS

Figure 1A:
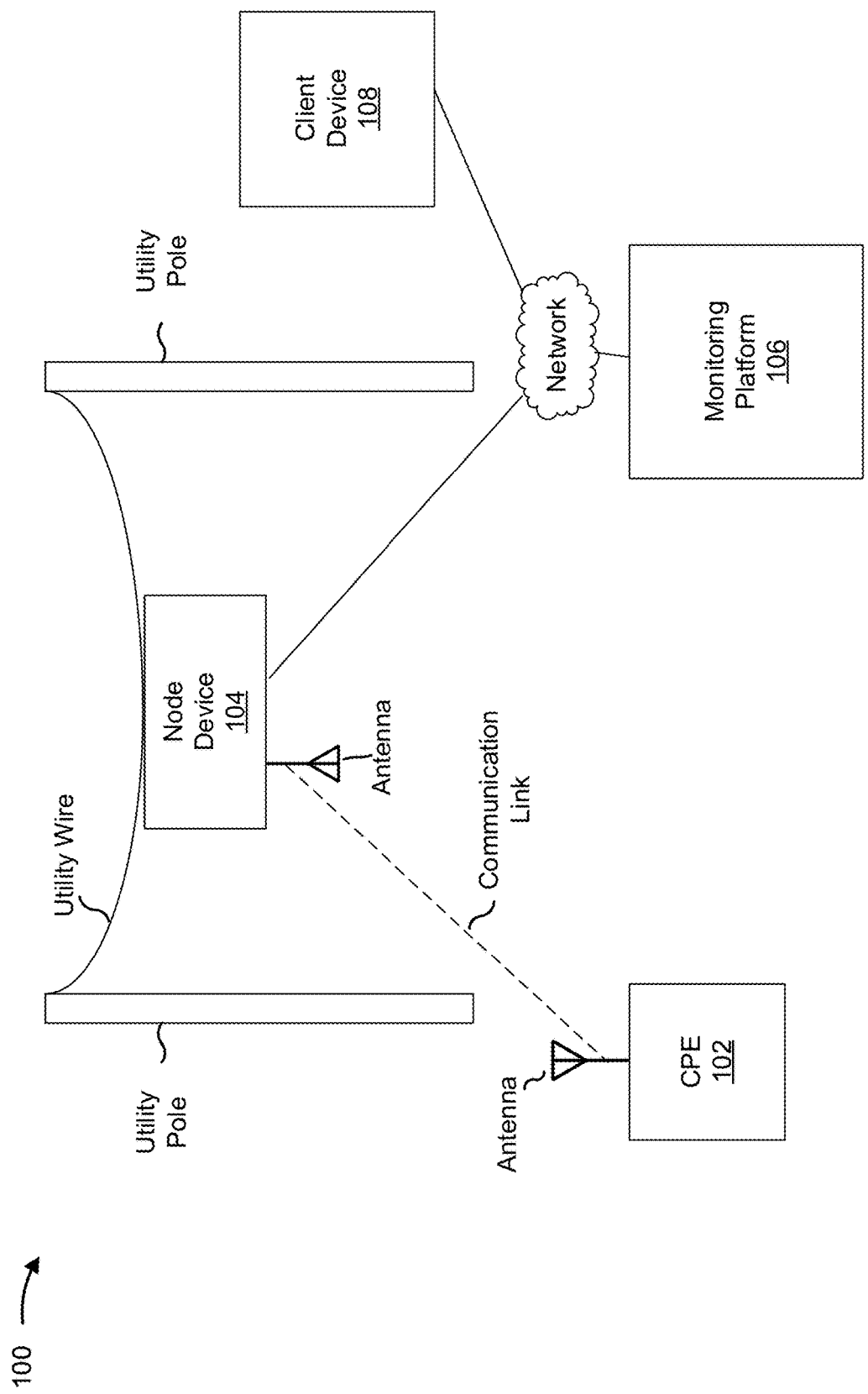

The following detailed description of example implementations refers to the accompanying drawings. The same reference numbers in different drawings may identify the same or similar elements.

In some instances, a node device, such as a low-powered cellular radio access node, may provide a customer premises equipment (CPE) with access to a network (e.g., the Internet). In some cases, the node device may be mounted to a structure, such as a utility pole, and may include an antenna to communicate with the CPE. In some cases, the node device and the CPE may communicate via a communication link when a direct line of sight view exists between an antenna of the CPE and the antenna of the node device. However, the communication link may become disrupted (e.g., because an object obstructs the line of sight view between the antenna of the CPE and the antenna of the node device). In such cases, the node device and the CPE cannot communicate while the communication link is disrupted. Further, the node device and/or the CPE cannot perform any actions to reestablish the communication link. Instead, a service technician must consume device or equipment resources to repair the communication link. For example, the service technician may travel in a vehicle to a location of the node device and/or the CPE, use one or more diagnostic devices to communicate with the node device and/or the CPE to determine a reason for a disruption to the communication link, use tools to remove an obstruction that is obstructing a line of sight view between the antenna of the CPE and the antenna of the node device, and/or the like.

Some implementations described herein provide a monitoring platform that controls a mobile node device. In some implementations, the monitoring platform may obtain information concerning a location of the node device on a utility wire and/or information concerning a location of an antenna of a customer premises equipment (CPE) (collectively referred to as "the information") and may cause, based on the information, the node device to move from a first node device position to a second node device position on the utility wire and/or an antenna of the node device to move from a first antenna position to a second antenna position to cause the node device and the CPE to communicate via a communication link. In some implementations, the monitoring platform may determine that the communication link is disrupted and may cause at least one camera device of the node device to capture one or more images concerning a coverage area of the antenna of the node device. In some implementations, the monitoring platform may obtain the one or more images, may determine a reason that the communication link is disrupted (e.g., an object may be obstructing a line of sight view between the antenna of the CPE and the antenna of the node device), and may cause an action to be performed based on the reason (e.g., causing the node device to move to a different node device position and/or the antenna of the node device to move to a different antenna position).

In this way, some implementations provide a monitoring platform that can automatically maintain or reestablish a communication link between a node device and a CPE by controlling the node device (e.g., by causing the node device and/or an antenna of the node device to move). Accordingly some implementations conserve resources of devices or equipment (e.g., diagnostic devices to communicate with the node device and/or the CPE, vehicles to transport a service technician to a location of the node device and/or the CPE, tools used to remove an obstruction that is obstructing a line of sight view between the antenna of the CPE and the antenna of the node device, and/or the like) that would otherwise be used to establish, maintain, and/or repair a communication link between the CPE and the node device. Moreover, some implementations reduce an amount of time a communication link is disrupted, which can result in more efficient operation of a network associated with the node device and/or a better user experience for a user that uses the CPE.

FIGS. 1A-1G are diagrams of one or more example implementations 100 described herein. As shown in FIG. 1A, example implementation(s) 100 may include a customer premises equipment (CPE) (shown in FIG. 1A as CPE 102), a node device (shown in FIG. 1A as node device 104), a monitoring platform (shown in FIG. 1A as monitoring platform 106), and/or a client device (shown in FIG. 1A as client device 108). The CPE may include, or may be connected to (e.g., via a wired or wireless connection), an antenna. In some implementations, the antenna of the CPE may not be collocated with the CPE. For example, the CPE may be in a building (e.g., a house, an apartment building, an office building, and/or the like) and the antenna of the CPE may be mounted on an outside wall or a roof of the building. The monitoring platform may be a computing device, a server, a cloud computing device, and/or the like. The client device may be a communication and/or computing device, such as a mobile phone, a smartphone, a laptop computer, a tablet computer, and/or the like.

The node device may be a cellular radio access node (e.g., a 5G millimeter wave (mmW) radio access node) and may include one or more antennas, one or more camera devices, a first set of motors to control movement of the node device, a second set of motors to control movement of the one or more antennas, and/or the like. The one or more antennas may be multiple-input, multiple-output (MIMO) arrays of antenna elements, where each antenna element is capable of a degree of movement (e.g., from a default position). Additionally, or alternatively, the node device may include an altimeter (e.g., for determining a height of the node device), a relative position sensor (e.g., for determining a position of the node device on a utility wire), a global positioning system (GPS) device (e.g., for determining a physical location of the node device), and/or the like. As shown in FIG. 1A, the node device may be attached to a utility wire that hangs between two utility poles. The utility wire may include one or more of coaxial cables, fiber optic cables, telephone cables, and/or the like. The node device may use the first set of motors to move the node device along the utility wire (e.g., from a first node device position to a second node device position on the utility wire) and may use the second set of motors to move the one or more antennas (e.g., move an antenna from a first antenna position to a second antenna position). Additionally, or alternatively, the node device may be attached to a special purpose wire (e.g., as opposed to a utility wire) that hangs between two utility poles. The special purpose wire may be configured to enable movement of the node device (or multiple node devices) along the special purpose wire, which may prevent potential damage or wear and tear to a utility wire that would otherwise be used by the node device. The special purpose wire may be comprised of a durable material (e.g., nylon, rubber, and/or the like) for facilitating movement of the node device. In some implementations, the node device may move along the special purpose wire in a similar manner as described herein in regard to the node device moving along the utility wire. Additional description regarding the node device is described herein in relation to FIGS. 2A-2B.

As shown in FIG. 1A, the node device, the monitoring platform, and/or the client device may be connected via a network, such as a wired network (e.g., the Internet or another data network), a wireless network (e.g., a wireless local area network, a wireless wide area network, a cellular network, etc.), and/or the like. The CPE and the node device may be connected via a communication link (e.g., a wireless, line of sight connection between the antenna of the CPE and an antenna of the node device). The node device may provide the CPE access to the network (e.g., via the communication link). Some example implementations described herein concern a single CPE, a single node device, a single monitoring platform, and/or a single client device, but implementations can include a plurality of CPEs, a plurality of node devices, a plurality of monitoring platforms, a plurality of client devices, and/or the like.

As shown in FIG. 1B and by reference number 110, the monitoring platform may obtain information concerning the location of the node device. For example, the node device may send the information concerning the location of the node device to the monitoring platform (e.g., on a scheduled basis, on an on-demand basis, on a triggered basis, and/or the like). The information concerning the location of the node device may include a height of the node device (e.g., a height of the node device relative to the ground), a position of the node device on the utility wire (e.g., a relative position of the node device between two utility poles), a physical location of the node device (e.g., a latitude and longitude of the node device), and/or the like.

Additionally, or alternatively, the monitoring platform may access a data structure to obtain the information concerning the location of the node device. In some implementations, the data structure may store, for each node device of a plurality of node devices, respective information concerning a location of the node device. The plurality of node devices may service a geographic area, such as a neighborhood, a town, a city, and/or the like. The monitoring platform may access the data structure to obtain information concerning a respective location of one or more devices associated with the geographic area.

As shown by reference number 112, the monitoring platform may obtain information concerning a location of the antenna of the CPE. For example, the client device may send the information concerning the location of the antenna of the CPE to the monitoring platform (e.g., on a scheduled basis, on an on-demand basis, on a triggered basis, and/or the like). In a specific example, an installer of the CPE (e.g., at the premises of a customer) may interact with the client device (e.g. via a user interface of the client device) to input the information concerning the location of the antenna of the CPE, which may cause the client device to send the information concerning the location of the antenna of the CPE to the monitoring platform. The information concerning the location of the antenna of the CPE may include a physical location of the antenna of the CPE (e.g., a latitude and longitude of the antenna of the CPE), a height of the antenna of the CPE (e.g., a height of the antenna of the CPE relative to the ground), a direction of the antenna of the CPE (e.g., a direction in which the antenna of the CPE is pointing), and/or the like.

Additionally, or alternatively, the monitoring platform may access a data structure to obtain the information concerning the location of the antenna of the CPE. In some implementations, the data structure may store, for each CPE of a plurality of CPEs, respective information concerning a location of an antenna of the CPE. The plurality of CPEs may be associated with the geographic area serviced by the plurality of node devices. The monitoring platform may access the data structure to obtain information concerning a respective location of antennas of one or more CPEs associated with the geographic area.

Figure 1C:
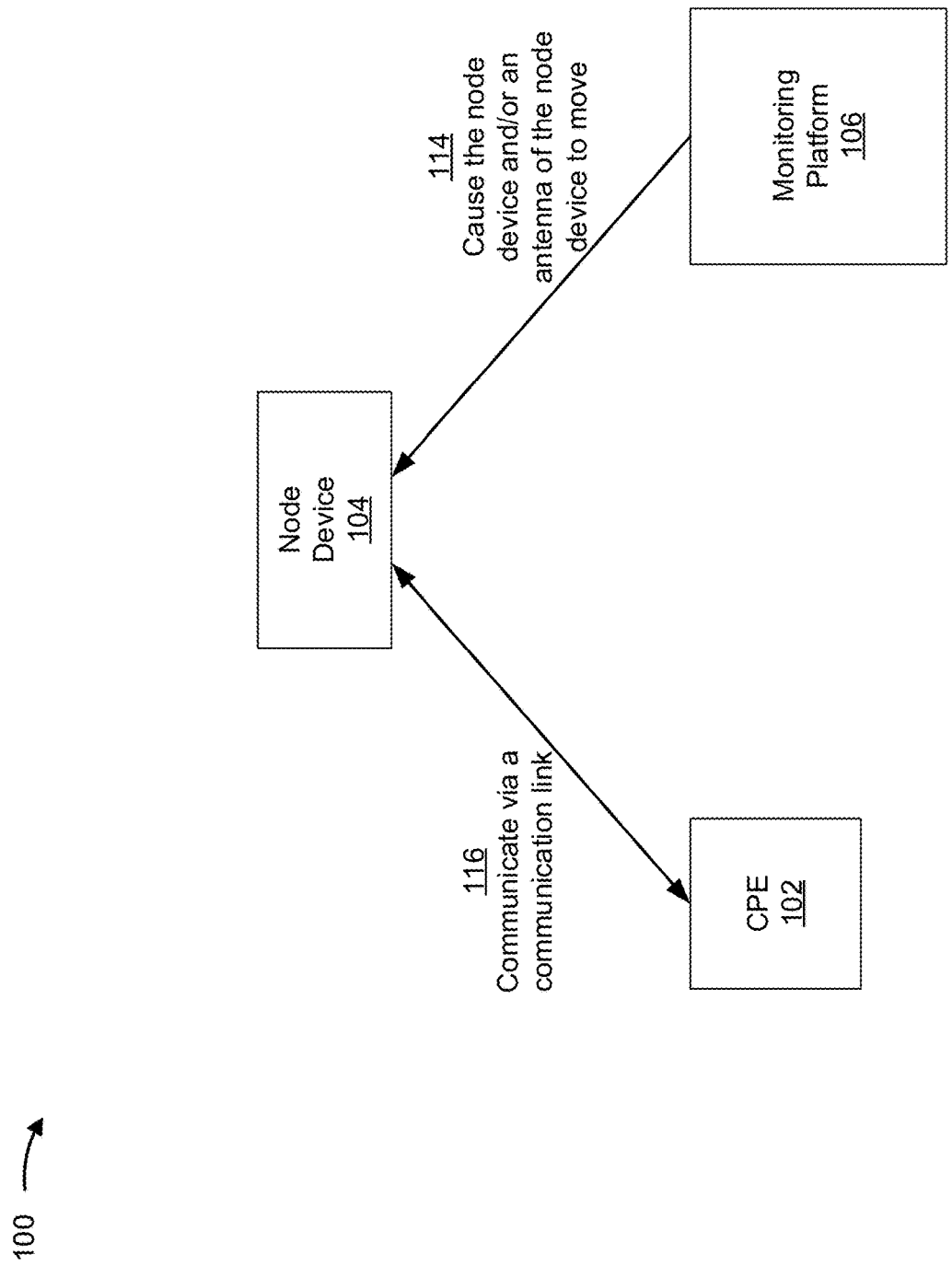

As shown in FIG. 1C and by reference number 114, the monitoring platform may cause the node device to move and/or at least one antenna of the node device to move. For example, the monitoring platform may cause the node device to move from a first node device position to a second node device position on the utility wire (e.g., as shown in FIG. 2B). In some implementations, the monitoring platform may generate and send one or more first instructions to the node device (e.g., that indicate that the node device is to move to the second node device position). The node device may execute the one or more first instructions to engage the first set of motors of the node device to move the node device along the utility wire from the first node device position to the second node device position.

As another example, the monitoring platform may cause the at least one antenna of the node device to move from a first antenna position to a second antenna position (e.g., cause the at least one antenna of the node device to pan left or right, tilt up or down, and/or the like). In some implementations, the monitoring platform may generate and send one or more second instructions to the node device (e.g., that indicate that the at least one antenna of the node device is to move to the second antenna position). The node device may execute the one or more second instructions to engage the second set of motors of the node device to move the at least one antenna of the node device from the first antenna position to the second antenna position.

In some implementations, the monitoring platform may process the information concerning the location of the node device and/or the information concerning the location of the antenna of the CPE to determine the second node device position and/or the second antenna position. In some implementations, the monitoring platform may use a first machine learning model to determine the second node device position and/or the second antenna position.

In some implementations, the monitoring platform may generate and/or train the first machine learning model to determine a second node device position and/or a second antenna position. For example, the monitoring platform may obtain (e.g., from the data structure) and process historical information (e.g., historical information concerning locations of a plurality of node devices, historical information concerning locations of respective antennas of a plurality of CPEs, historical information concerning node device positions of the plurality of node devices, historical information concerning antenna positions of a respective at least one antenna of the plurality of node devices, historical information concerning a status of respective communication links between the plurality of node devices and the plurality of CPEs, and/or the like) to generate and/or train the first machine learning model to determine a second node device position and/or a second antenna position.

The determined second node device position may be an optimal node device position for the node device (e.g., in terms of providing a line of sight view between the at least one antenna of the node device and the antenna of the CPE, which may enable communication via a communication link, as described herein; in terms of enabling communication between the node device and multiple CPEs via multiple communication links within a geographic area serviced by the node device; in terms of enabling communication between multiple node devices and multiple CPEs via multiple communication links within a geographic area serviced by the multiple node devices; and/or the like). Similarly, the determined second antenna position may be an optimal antenna position for the at least one antenna of the node device (e.g., in terms of providing a line of sight view between the at least one antenna of the node device and the antenna of the CPE, which may enable communication via a communication link, as described herein; in terms of enabling communication between the node device and multiple CPEs via multiple communication links within a geographic area serviced by the node device; in terms of enabling communication between multiple node devices and multiple CPEs via multiple communication links within a geographic area serviced by the multiple node devices, and/or the like).

In some implementations, the monitoring platform may perform a set of data manipulation procedures to pre-process the historical information to generate the first machine learning model. The monitoring platform may use a data pre-processing procedure, a model training procedure, a model verification procedure, and/or the like to pre-process the historical information to generate processed historical information. For example, the monitoring platform may pre-process the historical information to remove irrelevant information, confidential data, corrupt data, and/or the like; to replace personal information with generic information; to infer and/or to address missing information and/or to remove records that include missing information; and/or the like. In this way, the monitoring platform may organize thousands, millions, or billions of data entries for machine learning and model generation.

In some implementations, the monitoring platform may perform a training operation when generating the first machine learning model. For example, the monitoring platform may portion the historical information into a training set (e.g., a set of data to train the model), a validation set (e.g., a set of data used to evaluate a fit of the model and/or to fine tune the model), a test set (e.g., a set of data used to evaluate a final fit of the model), and/or the like. In some implementations, a minimum feature set may be created from pre-processing and/or dimensionality reduction of the historical information. In some implementations, the monitoring platform may train the first machine learning model on this minimum feature set, thereby reducing processing required to train the first machine learning model, and may apply a classification technique to the minimum feature set.

When training the first machine learning model, the monitoring platform may utilize a random forest classifier technique to train the first machine learning model. For example, the monitoring platform may utilize a random forest classifier technique to construct multiple decision trees during training and may output a classification of the historical information. As another example, the monitoring platform may utilize a random forest regression technique to construct multiple decision trees during training and may output a numeric predication associated with the historical information. Additionally, or alternatively, when training the first machine learning model, the monitoring platform may utilize one or more gradient boosting techniques to generate the first machine learning model. For example, the monitoring platform may utilize an xgboost classifier technique, an xgboost regression technique, a gradient boosting machine (GBM) technique, a gradient boosting tree, and/or the like to generate a prediction model from a set of weak prediction models.

When training the first machine learning model, the monitoring platform may utilize a logistic regression technique to train the first machine learning model. For example, the monitoring platform may utilize a binary classification of the historical information (e.g., whether the historical information is indicative of a particular accurate prediction), a multi-class classification of the historical information (e.g., whether the historical information is indicative of one or more accurate predictions), and/or the like to train the first machine learning model. Additionally, or alternatively, when training the first machine learning model, the monitoring platform may utilize a naïve Bayes classifier technique to train the first machine learning model. For example, the behavioral analytics platform may utilize binary recursive partitioning to divide the historical information into various binary categories (e.g., starting with whether the historical information is indicative of a particular accurate prediction). Based on using recursive partitioning, the monitoring platform may reduce utilization of computing resources relative to manual, linear sorting and analysis of data points, thereby enabling use of thousands, millions, or billions of data points to train a machine learning model, which may result in a more accurate first machine learning model than using fewer data points.

Additionally, or alternatively, when training the first machine learning model, the monitoring platform may utilize a support vector machine (SVM) classifier technique. For example, the monitoring platform may utilize a linear model to implement non-linear class boundaries, such as via a max margin hyperplane. Additionally, or alternatively, when utilizing the SVM classifier technique, the monitoring platform may utilize a binary classifier to perform a multi-class classification. Use of an SVM classifier technique may reduce or eliminate overfitting, may increase a robustness of the first machine learning model to noise, and/or the like.

In some implementations, the monitoring platform may train the first machine learning model using a supervised training procedure. In some implementations, the monitoring platform may receive additional input to the first machine learning model from a subject matter expert. In some implementations, the monitoring platform may use one or more other model training techniques, such as a neural network technique, and/or the like. For example, the monitoring platform may perform a multi-layer artificial neural network processing technique (e. g, using a recurrent neural network architecture, a two-layer feedforward neural network architecture, a three-layer feedforward neural network architecture, and/or the like) to perform pattern recognition with regard to patterns in the historical information. In this case, use of the artificial neural network processing technique may improve an accuracy of a supervised learning model generated by the monitoring platform by being more robust to noisy, imprecise, or incomplete data, and by enabling the monitoring platform to detect patterns and/or trends undetectable to human analysts or systems using less complex techniques. Furthermore, when using a recurrent neural network architecture, long short-term memory (LSTM) may be employed to classify, make predictions, and/or otherwise process time-series data, which may be useful to predict how patterns change over time (e.g., over a month, a year, and/or the like).

In some implementations, a different device, such as a server device, may generate and/or train the first machine learning model. The monitoring platform may obtain the first machine learning model from the different device. For example, the different device may send the first machine learning model to the monitoring platform and/or the monitoring platform may request and receive the first machine learning model from the different device. In some implementations, the different device may update and send (e.g., on a scheduled basis, on an on-demand basis, on a triggered basis, and/or the like) the first machine learning model to the monitoring platform. The monitoring platform may obtain the updated first machine learning model from the different device.

In this way, the monitoring platform may use artificial intelligence techniques, machine learning techniques, deep learning techniques, and/or the like to determine one or more associations between historical information and a determination indicating a second node device position and/or a second antenna position.

As shown by reference number 116, the monitoring platform may cause the node device and the CPE to communicate via a communication link (e.g., a 5G mmW communication link). For example, causing the node device to move to the second node device position and/or the at least one antenna to move to the second antenna position, may allow the at least one antenna of the node device and the antenna of the CPE to have a direct, unobstructed line of sight view of each other. Consequently, because the node device and the CPE can directly exchange information, the node device and the CPE may establish a communication link and/or communicate via the communication link.

Figure 1D:
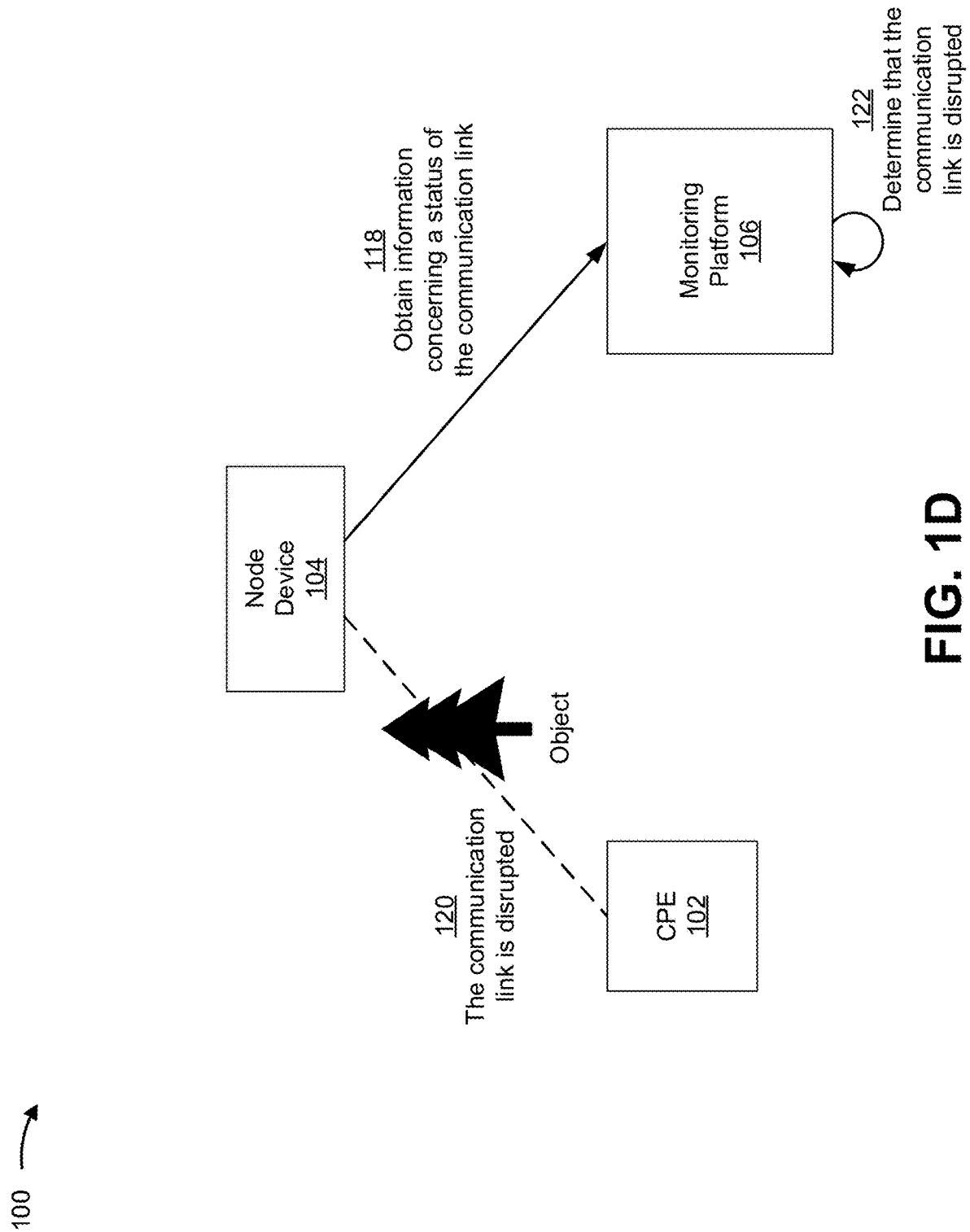

As shown in FIG. 1D and by reference number 118, the monitoring platform may obtain information concerning the status of the communication link. For example, the node device may send information concerning the status of the communication link to the monitoring platform (e.g., on a scheduled basis, on an on-demand basis, on a triggered basis, and/or the like). The information concerning the status of the communication link may indicate whether the node device is able to communicate with the CPE via the communication link, a quality of the communication link, a transfer speed associated with the communication link, whether information intended to be transmitted via the communication link is being lost, and/or the like.

As shown by reference number 120, the communication link may become disrupted (e.g., the communication link may terminate, a quality of the communication link may degrade, a transfer speed associated with communication link may degrade, information intended to be transmitted via the communication link may be lost, and/or the like). For example, at least one object, such as a structure, a vehicle, a tree, foliage, and/or the like may obstruct, or partially obstruct, the line of sight view between the antenna of the CPE and the at least one antenna of the node device and therefore disrupt the communication link. As another example, a physical location, a height, a direction, and/or the like of the antenna of the CPE may change (e.g., because of weather conditions, such as a wind storm; physical movement of the antenna of the CPE (e.g., by a landscaper); and/or the like), which may impair the line of sight view between the antenna of the CPE and the at least one antenna of the node device and therefore disrupt the communication link. In another example, the antenna of the CPE and/or the at least one antenna of the node device may malfunction, which may impact an ability of the CPE and/or the node device to communicate and therefore disrupt the communication link.

As shown by reference number 122, the monitoring platform may determine that the communication link is disrupted. For example, after the communication link is disrupted, the node device may send the information concerning the status of the communication link (e.g., as described herein in relation to reference number 118) to the monitoring platform. The monitoring platform may process the information concerning the status of the communication link to determine that the communication link is disrupted.

Figure 1E:
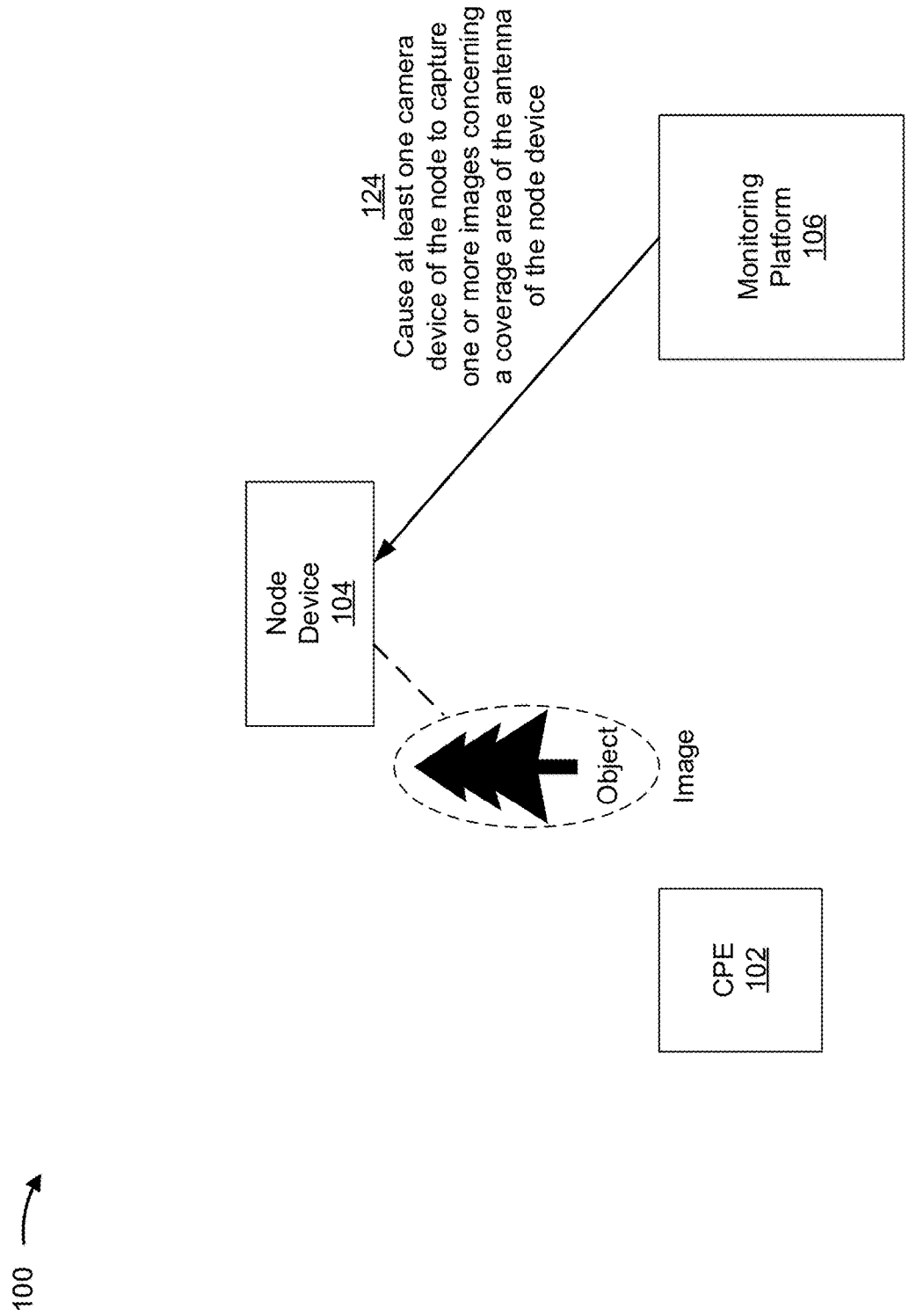

As shown in FIG. 1E and by reference number 124, the monitoring platform may cause at least one camera device of the node device to capture one or more images concerning a coverage area of the at least one antenna of the node device (e.g., an area in which the at least one antenna of the node device can communicate with another antenna, which may include the line of sight view between the antenna of the CPE and the antenna of the node device). For example, based on determining that the communication link is disrupted, the monitoring platform may generate and send one or more instructions to the node device to capture one or more images concerning the coverage area of the at least one antenna of the node device. The node device may execute the one or more instructions to cause the at least camera device of the node device to point in the same direction as the direction of the at least one antenna of the node device, point at the antenna of the CPE, and/or the like, and capture the one or more images. The one or more images may include image data concerning: one or more objects in the coverage area of the at least one antenna of the node device, the antenna of the CPE, the node device, the at least one camera of the node device, the utility wire, and/or the like.

Figure 1F:
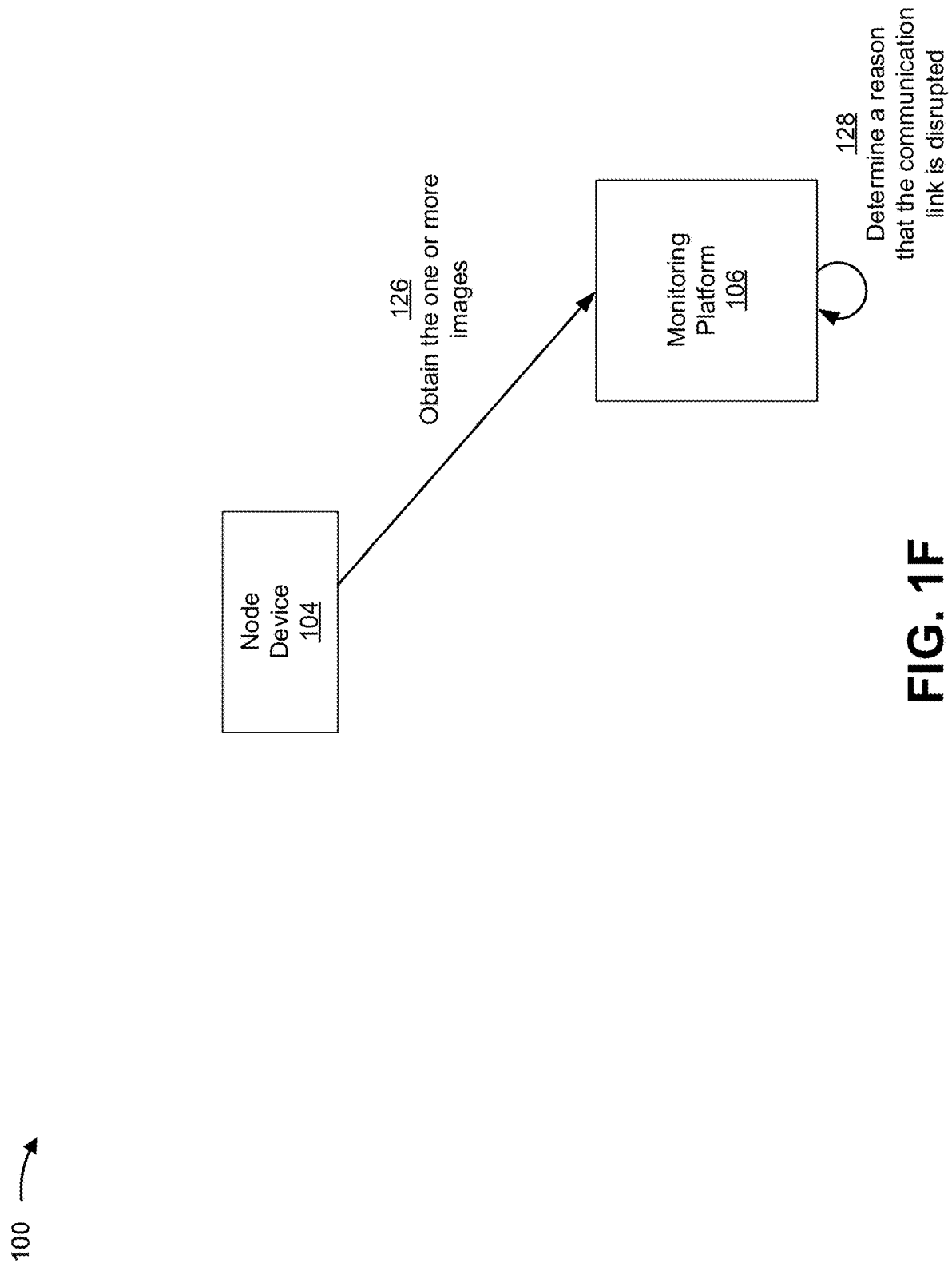

As shown in FIG. 1F and by reference number 126, the monitoring platform may obtain the one or more images. For example, the node device, after capturing the one or more images, may send the one or more images to the monitoring platform (e.g., on a scheduled basis, on an on-demand basis, on a triggered basis, and/or the like).

As shown by reference number 128, the monitoring platform may determine a reason that the communication link is disrupted. The monitoring platform may process the one or more images (e.g. using a computer vision processing technique, such as an object detection technique) to determine the reason the communication link is disrupted. In some implementations, the reason the communication link is disrupted may include at least one object that is obstructing the line of sight view between the antenna of the CPE and the antenna of the node device; a physical location, a height, a direction, and/or the like of the antenna of the CPE has changed; the antenna of the node device and/or the antenna of the CPE is malfunctioning; and/or the like.

For example, the monitoring platform may process the one or more images using an object detection technique to identify one or more objects and may determine, based on identifying the one or more objects, that at least one object is obstructing the line of sight view between the antenna of the CPE and the antenna of the node device. As another example, the monitoring platform may process the one or more images using an object detection technique to identify the antenna of the CPE. Accordingly, the monitoring platform may determine, based on identifying the antenna of the CPE, that a physical location, a height, and/or a direction of the antenna of the CPE has changed (e.g., as compared to a previous physical location, height, and/or direction of the CPE, which may be indicated by the information concerning the location of the antenna of the CPE that was obtained by the monitoring platform, as described herein in relation to FIG. 1B). Additionally, or alternatively, the monitoring platform may determine, based on identifying the antenna of the CPE, that a physical location, a height, and/or a direction of the antenna of the CPE has not changed. Consequently, the monitoring platform may determine that the antenna of the node device and/or the antenna of the CPE is malfunctioning (e.g., because the antenna of the CPE has not changed and the line of sight view between the antenna of the CPE and the antenna of the node device is not obstructed by an object).

Figure 1G:
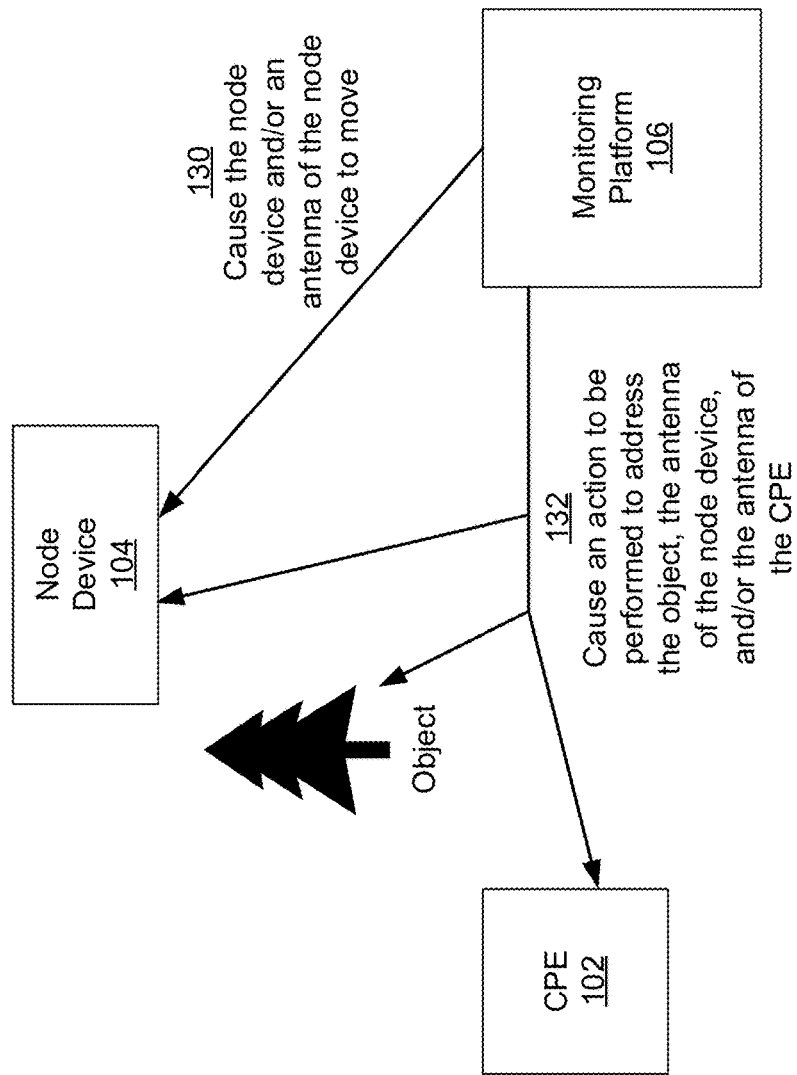

As shown in FIG. 1G and by reference number 130, the monitoring platform may cause, based on determining the reason the communication link is disrupted, the node device and/or the at least one antenna of the node device to move, in a similar manner as described herein in relation to FIG. 1C. For example, when the reason the communication link is disrupted because the line of sight view between the antenna of the CPE and the antenna of the node device is obstructed by the at least one object, the monitoring platform may process the one or more images to determine a different node device position on the utility wire for the node device and/or a different antenna position for the at least one antenna of the node device.

In some implementations, the monitoring platform may process the one or more images using a second machine learning model to determine the different node device position and/or the different antenna position. In some implementations, the monitoring platform may receive, generate, and/or train the second machine learning model in a similar manner as described herein in relation to the first machine learning model. For example, the monitoring platform, or a different device (e.g., a server device), may generate and/or train the second machine learning model based on historical information (e.g., one or more historical images captured by a respective at least one camera device of a plurality of node devices, historical information concerning locations of the plurality of node devices, historical information concerning locations of respective antennas of a plurality of CPEs, historical information concerning node device positions of the plurality of node devices, historical information concerning antenna positions of a respective at least one antenna of the plurality of node devices, historical information concerning a status of respective communication links between the plurality of node devices and the plurality of CPEs, and/or the like). In some implementations, the monitoring platform, or the different device, may perform a set of data manipulation procedures, perform a training operation, use a classification technique, perform a recursive feature elimination procedure, and/or the like as described herein, to determine an association between the historical information and a determination indicating a different node device position and/or a different antenna position.

Accordingly, the monitoring platform may cause the node device to move to the different node device position on the utility wire and/or the at least one antenna of the node device to move to the different antenna position. Moving the node device to the different node device position and/or moving the at least one antenna of the node device to the different antenna position may cause the antenna of the CPE to be in the coverage area of the antenna of the node device (e.g., without being obstructed by the at least one object) and therefore the line of sight view between the antenna of the CPE and the antenna of the node device may be restored. In this way, the monitoring platform may enable the antenna of the CPE to be in the coverage area of the antenna of the node device, the line of sight view between the antenna of the CPE and the antenna of the node device to be restored, the CPE and the node device to resume communicating via the communication link, and/or the like.

Additionally, or alternatively, the monitoring platform may cause the physical location, the height, and/or the direction of the antenna of the CPE (e.g., the direction in which the antenna of the CPE is pointing) to change. For example, when the reason the communication link is disrupted is because at least one object partially obstructs the line of sight view between the antenna of the CPE and the at least one antenna of the node device, the monitoring platform may send one or more instructions (e.g., via the node device) to the CPE via the communication link (e.g., because the communication link is still operational, even if degraded). As another example, when the reason the communication link is disrupted is because at least one object completely obstructs the line of sight view between the antenna of the CPE and the at least one antenna of the node device, the monitoring platform may send one or more instructions (e.g., via the node device) to the CPE via an alternative communication link (e.g., an alternative communication link that is not affected by line of sight obstructions), such as a 4G long term evolution (LTE) communication link. The one or more instructions may include instructions for the CPE to cause the antenna of the CPE to move (e.g., horizontally and/or vertically) for a particular amount of time until the monitoring platform determines that the at least one object no longer partially obstructs the line of sight view between the antenna of the CPE and the at least one antenna of the node device (e.g., by obtaining one or more images and processing the one or more images, as described herein). Additionally, or alternatively, the monitoring platform may send the one or more instructions (e.g., via the node device) to the CPE when the communication link is established, so that the CPE may execute the one or more instructions any time the CPE determines that the communication link is down to cause the antenna of the CPE to move until the CPE determines that communication link is reestablished. In this way, the monitoring platform can cause the CPE to perform a routine to reestablish a communication link without having to cause the node device and/or the at least one antenna of the node device to move.

Additionally, or alternatively, as shown by reference number 132, the monitoring platform may cause, based on determining the reason that the communication link is disrupted, an action to be performed to address the at least one object, the at least one antenna of the node device, the antenna of the CPE, and/or the like. For example, when the reason the communication link is disrupted is because the line of sight view between the antenna of the CPE and the at least one antenna of the node device is obstructed by the at least one object, the monitoring platform may process (e.g., using a third machine learning model, as described herein) the one or more images to determine whether a service technician, a service robot, a service drone, and/or the like can address the at least one object (e.g., remove, eliminate, dispose of, and/or the like the at least one object using a tool, such as a chainsaw, a hedge trimmer, pruning shears, and/or the like). When the monitoring platform determines that a service technician, a service robot, a service drone, and/or the like can address the at least one object, the monitoring platform may generate and send one or more instructions to a different device, such as the client device, to cause the different device to dispatch a service technician, a service robot, a service drone, and/or the like to address the at least one object.

As another example, when the reason the communication link is disrupted is because a physical location, a height, or a direction of the antenna of the CPE has changed, the monitoring platform may process (e.g., using the third machine learning model, as described herein) the one or more images to determine whether a service technician, a service robot, a service drone, and/or the like is needed to service the antenna of the CPE (e.g., to reattach the antenna of the CPE to a mount, to replace a missing antenna, and/or the like) or whether another person, such as a customer associated with the CPE, can service the antenna (e.g., manually reposition the antenna to point at the at least one antenna of the node device). When the monitoring platform determines that a service technician, a service robot, a service drone, and/or the like is needed to service the antenna of the CPE, the monitoring platform may generate and send one or more instructions to a different device, such as the client device, to cause the different device to dispatch a service technician, a service robot, a service drone, and/or the like to service the antenna of the CPE. Additionally, or alternatively, when the monitoring platform determines that a service technician, a service robot, a service drone, and/or the like is not needed to service the antenna of the CPE, the monitoring platform may generate and send one or more instructions to another device, such as a user device of the customer, to cause the different device to display information on how to service the antenna of the CPE on a display of the different device.

In another example, when the reason that the communication link is disrupted is because the at least one antenna of the node device and/or the antenna of the CPE is malfunctioning, the monitoring platform may process (e.g., using the third machine learning model, as described herein) the one or more images to determine what items, tools, and/or equipment (e.g., a replacement CPE antenna, a replacement node device, a chainsaw, a bucket truck to reach the node device, and/or the like) is needed for a service technician, a service robot, a service drone, and/or the like to service the at least one antenna of the node device and/or the antenna of the CPE. The monitoring platform may generate and send one or more instructions to a different device, such as the client device, to cause the different device to identify and dispatch a service technician, a service robot, a service drone, and/or the like that has the items, tools, and/or equipment that are needed to service the at least one antenna of the node device and/or the antenna of the CPE.

In some implementations, in reference to the examples above, the monitoring platform, or a different device (e.g., a server device), may process the one or more images using a third machine learning model to determine whether a service technician, a service robot, a service drone, and/or the like can address the at least one object obstructing the line of sight view between the antenna of the CPE and the at least one antenna of the node device; to determine whether a service technician, a service robot, a service drone, and/or the like is needed to service the antenna of the CPE; and/or to determine what items, tools, and/or equipment are needed for a service technician, a service robot, a service drone, and/or the like to service the at least one antenna of the node device and/or the antenna of the CPE. In some implementations, the monitoring platform may receive, generate, and/or train the third machine learning model in a similar manner as described herein in relation to the first machine learning model and/or the second machine learning model. For example, the monitoring platform may generate and/or train the third machine learning model based on historical information (e.g., one or more historical images captured by a respective at least one camera device of a plurality of node devices, historical information concerning whether a service technician, a service robot, a service drone, and/or the like can address at least one object obstructing a line of sight view between an antenna of a CPE and at least one antenna of a node device; historical information concerning whether a service technician, a service robot, a service drone, and/or the like is needed to service an antenna of a CPE; historical information concerning what items, tools, and/or equipment are needed for a service technician, a service robot, a service drone, and/or the like to service at least one antenna of a node device and/or an antenna of a CPE, and/or the like). In some implementations, the monitoring platform, or the different device, may perform a set of data manipulation procedures, perform a training operation, use a classification technique, perform a recursive feature elimination procedure, and/or the like as described herein, to determine an association between historical information and a determination indicating whether a service technician, a service robot, a service drone, and/or the like can address at least one object obstructing a line of sight view between an antenna of a CPE and at least one antenna of a node device; whether a service technician, a service robot, a service drone, and/or the like is needed to service an antenna of a CPE; and/or what items, tools, and/or equipment are needed for a service technician, a service robot, a service drone, and/or the like to service at least one antenna of a node device and/or an antenna of a CPE.

In this way, the monitoring platform may enable the line of sight view between the antenna of the CPE and the antenna of the node device to be restored, the CPE and the node device to resume communicating via the communication link, and/or the like using an automated and efficient use of resources.

While some implementations described herein concern the monitoring platform causing the node device and/or at least one antenna of the node device to move to enable the node device and the CPE to communicate via the communication link, other implementations are also contemplated. For example, the monitoring platform may cause (e.g., on a scheduled basis, on an on-demand basis, on a triggered basis, and/or the like) the at least one camera device of the node device to capture one or more images concerning an area around the node device (e.g., a radius around the node device). In some implementations, the monitoring platform may receive a request for the one or more images from a device (e.g., a device associated with a law enforcement agency, a security services organization, and/or the like) and the monitoring platform may cause the node device to send the one or more images to the device. In this way, the monitoring platform may be able to enable the node device to provide additional safety and/or security benefits to the area around the node device.

While some implementations described herein describe the monitoring platform and/or the client device performing one or more operations, additional implementations are contemplated where the node device performs any and/or all of the one or more operations.

As indicated above, FIGS. 1A-1G are provided merely as examples. Other examples may differ from what is described with regard to FIGS. 1A-1G. Further, the number and arrangement of devices and networks shown in FIGS. 1A-1G are provided as an example. In practice, there may be additional devices and/or networks, fewer devices and/or networks, different devices and/or networks, or differently arranged devices and/or networks than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) of example implementation 100 may perform one or more functions described as being performed by another set of devices of example implementation 100.

Figure 2A:
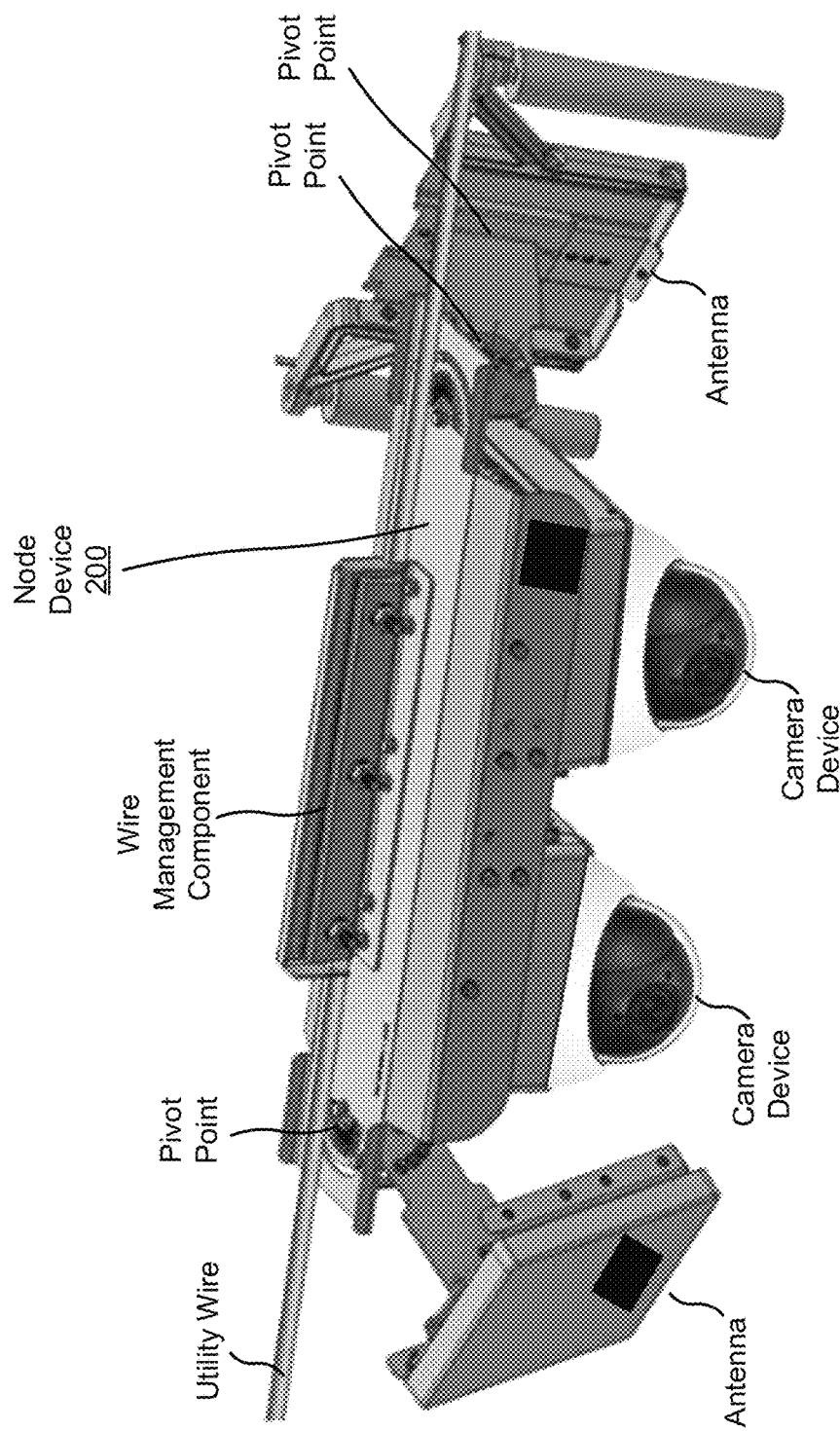
FIGS. 2A-2B are diagrams of an example node device described herein.
Figure 2B:
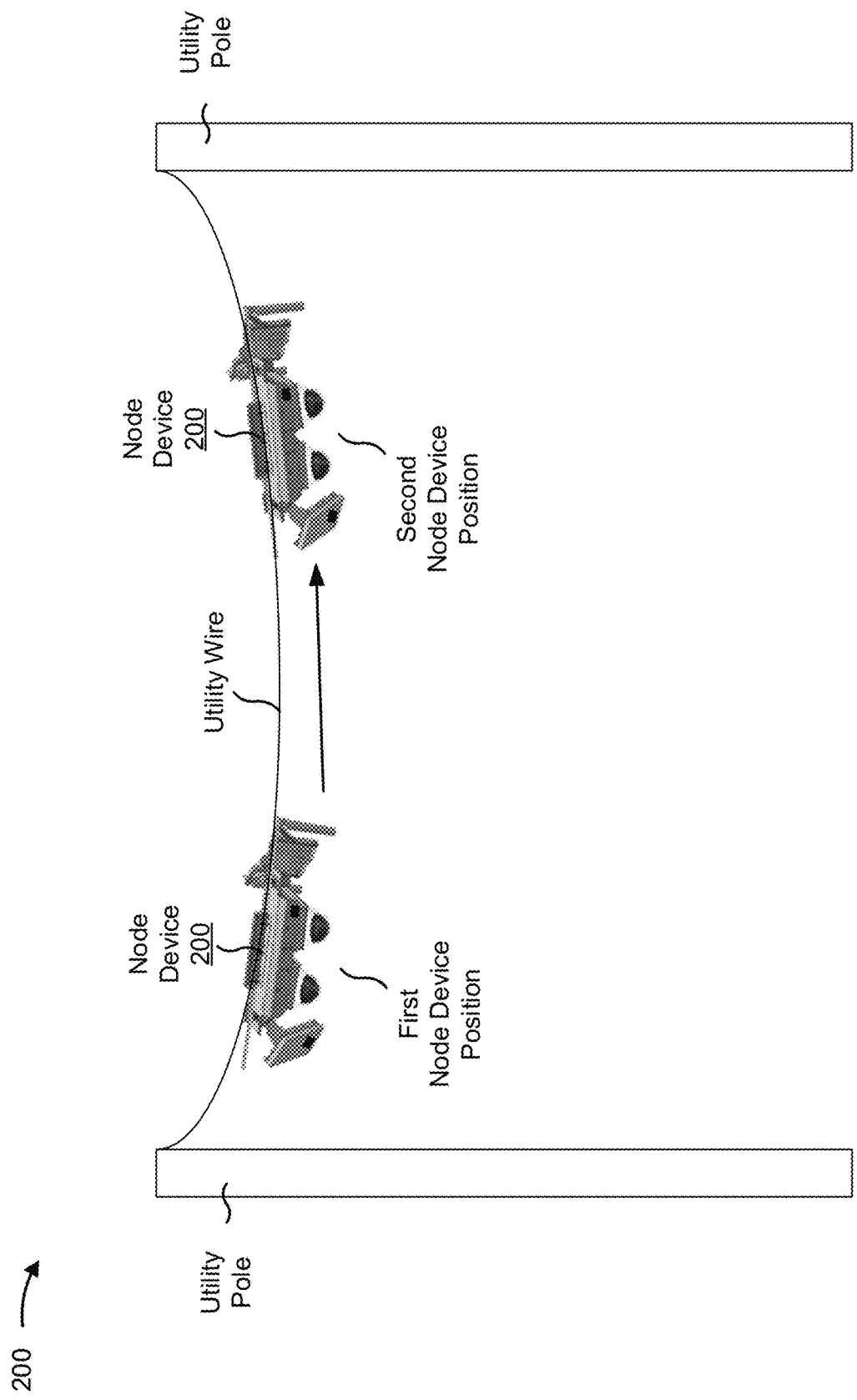

FIGS. 2A-2B are diagrams of an example node device described herein. FIG. 2A is a diagram of an example node device 200 attached to a utility wire that hangs between two utility poles (not shown). Node device 200 may be a cellular radio access node (e.g., a 5G mmW radio access node) and the utility wire may include one or more of coaxial cables, fiber optic cables, telephone cables, and/or the like. As shown in FIG. 2A, the node device 200 may include one or more camera devices and/or one or more antennas. Each antenna may have a coverage area (e.g., an area in which the antenna can communicate with another antenna, such as an antenna of a CPE). The coverage area may be based on a direction of the antenna (e.g., a direction the antenna is pointing). In some implementations, each camera device, of the one or more camera devices, may be associated with a respective antenna, of the one or more antennas. That is, each camera device may be physically located near a respective antenna so that the camera device can capture one or more images concerning the coverage of the area of the antenna when the camera device is pointed in the same direction as the antenna.

In some implementations, node device 200 may include a first set of motors (not shown in FIG. 2A) to control movement of the node device. The node device 200 may engage the first set of motors to move the node device 200 along the utility wire (as further described herein in relation to FIG. 2B). For example, the node device 200 may engage the first set of motors to move the node device 200 along the utility wire from a first node device position to a second node device position. The node device 200 may include a wire management component (e.g., a slack reel to reduce or increase slack) to ensure that the utility wire does not snag or become damaged as the node device 200 moves along the utility wire. Additionally, or alternatively, the wire management component may ensure that any electrical power wire (e.g., for providing electrical power to node device 200), wired data connection (e.g., for node device 200 to communicate with a base station), and/or the like does not snag or become damaged as the node device 200 moves along the utility wire.

In some implementations, the node device 200 may include a second set of motors (not shown in FIG. 2A) to control movement of the one or more antennas. The node device 200 may engage the second set of motors to move an antenna of the node device from a first antenna position to a second antenna position (e.g., by causing the antenna to pivot around one or more associated pivot points). For example, the node device may engage the second set of motors to cause the antenna to pan left or right (e.g., pivot left or right around a pivot point), tilt up or down (e.g., pivot up or down around a pivot point), and/or the like.

In some implementations, the node device 200 may include an altimeter (e.g., for determining a height of the node device 200), a relative position sensor (e.g., for determining a position of the node device 200 on the utility wire), a global positioning system (GPS) device (e.g., for determining a physical location of the node device 200), and/or the like. As shown in FIG. 1A, the node device may be attached to a utility wire that hangs between two utility poles.

FIG. 2B is a diagram of the node device 200 moving along the utility wire. As shown in FIG. 2B, the node device 200 may move laterally along the utility wire (e.g., between two utility poles) from a first node device position to a second node device position. The node device 200 may engage the first set of motors to cause the node device 200 to move from the first node device position to the second node device position. Additionally, or alternatively, the node device may move laterally along a special purpose wire (e.g., a wire for the node device to move along instead of a utility wire) from a first node device position to a second node device position in a similar manner. The node device 200 may engage the first set of motors to cause the node device 200 to move from the first node device position to the second node device position.

As indicated above, FIGS. 2A-2B are provided merely as an example. Other examples may differ from what is described with regard to FIGS. 2A-2B.

Figure 3:
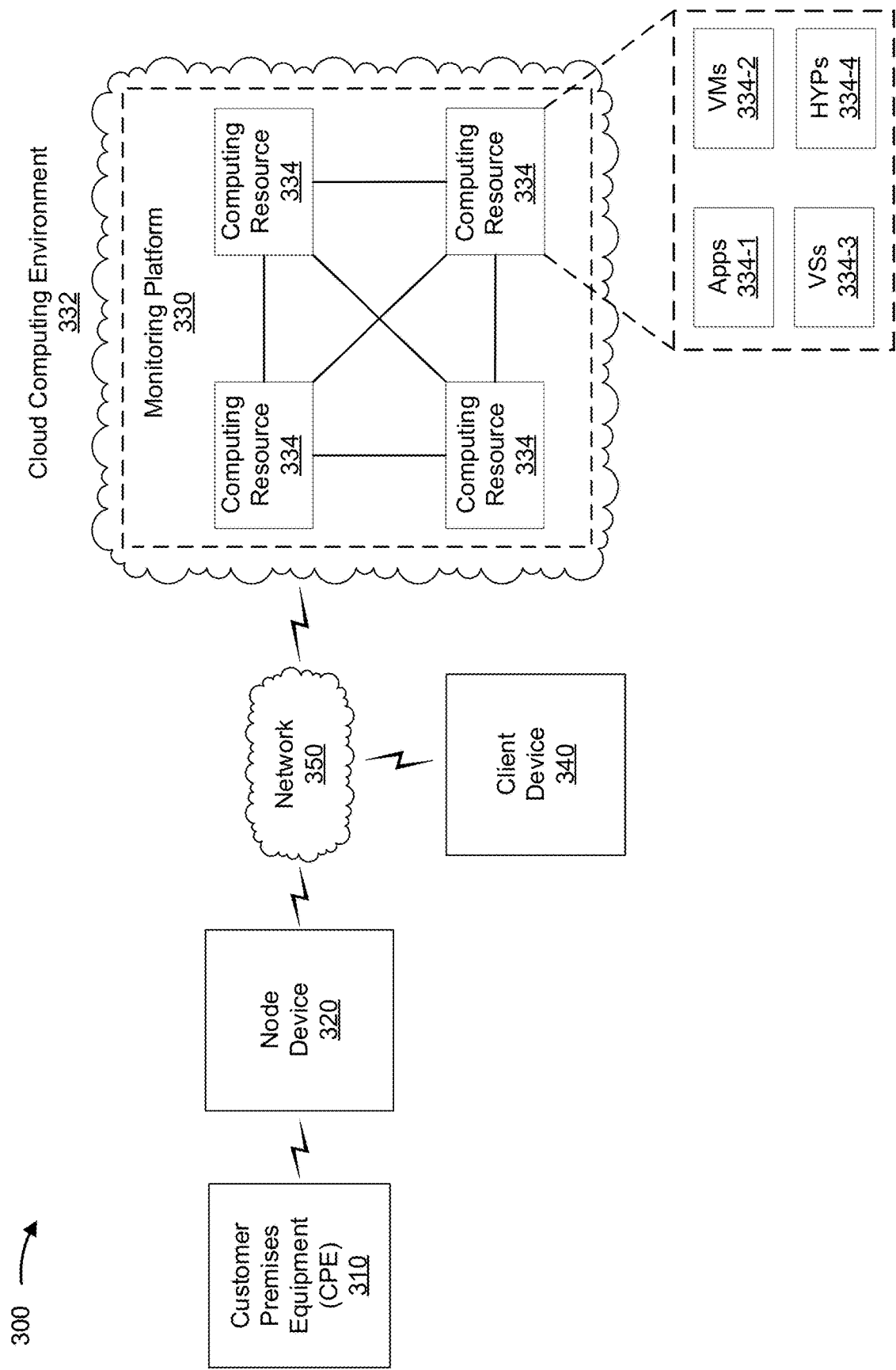
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a customer premises equipment (CPE) 310, a node device 320, a monitoring platform 330 in a cloud computing environment 332 that includes computing resources 334, a client device 340, a network 350, and/or the like. Devices of environment 300 may interconnect via wired connections, wireless connections, or a combination of wired and wireless connections.

CPE 310 includes one or more devices capable of receiving, generating, storing, processing, and/or providing information, such as information described herein. For example, CPE 310 may include a multi-function networking device that may combine the functions of a Digital Subscriber Line (DSL) or cable modem, a cellular modem (e.g., a long term evolution (LTE) modem, a 5G modem, a 5G mmW modem, and/or the like), a firewall, a router, a network switch, and/or a wireless access point into a single device. CPE 310 may employ one or more short-range wireless communication protocols for a wireless personal area network (WPAN) and/or a wireless local area network (WLAN), such as, for example, IEEE 802.15 (e.g., Bluetooth) and IEEE 802.11 (e.g., Wi-Fi). Alternatively, or additionally, different short-range wireless protocols and/or frequencies may be used by CPE 310. CPE 310 may also include one or more wired (e.g., Ethernet) connections. In some implementations, CPE 310 may include an antenna for communicating with node device 320 via a communication link, such as a 5G mmW communication link (e.g., based on a line of sight view between the antenna of CPE 310 and an antenna of node device 320).

Node device 320 includes one or more devices capable of receiving, generating, storing, processing, and/or providing information, such as information described herein. For example, node device 320 may include a wireless, low-powered cellular radio access node, such as a 5G mmW radio access node. Node device 320 may be associated with one or more utility poles and may obtain electrical power from an electrical power supply associated with the one or more utility poles. In some implementations, node device 320 may be connected (e.g., via an electrical power wire) to a device associated with a utility pole to obtain the electrical power (e.g., a device connected to the electrical power supply and configured to provide electrical power to one or more node devices 320). The device may provide electrical power (e.g., via one or more electrical power wires) to one or more node devices 320 associated with the device and/or the utility pole. The device may include a wire management component (e.g., a slack reel to reduce or increase slack) to ensure that that the one or more electrical power wires do not snag or become damaged as the node device(s) 320 moves from one node device position to another. Additionally, or alternatively, node device 320 may include a solar panel, a solar array, and/or the like for generating some or all of the electrical power.

Node device 320 may provide one or more devices with access to a network. For example, node device 320 may provide a communication link, such as a 5G mmW communication link, for CPE 310 to connect to network 350. Node device 320 may transfer traffic between CPE 310 and network 350 via a base station (e.g., a base transceiver station, a radio base station, a node B, an eNB, a gNB, a base station subsystem, a cellular site, a cellular tower (e.g., a cell phone tower, a mobile phone tower, and/or the like), an access point, a transmit receive point (TRP), a radio access node, a macrocell base station, a microcell base station, a picocell base station, a femtocell base station, or a similar type of device) using a wired or wireless backhaul interface between node device 320 and the base station. In some implementations, node device 320 be connected (e.g., via a wired data connection) to a device associated with a utility pole to transfer traffic between CPE 310 and network 350 (e.g., a device connected to the base station or network 350 to provide a one or more data connections to node devices 320). The device may provide a data connection (e.g., via one or more wired data connections) to one or more node devices 320 associated with the device and/or the utility pole. The device may include a wire management component (e.g., a slack reel to reduce or increase slack) to ensure that that the one or more wired data connections do not snag or become damaged as the node device(s) 320 move from one node device position to another.

In some implementations, node device may include one or more antennas (e.g., multiple-input, multiple-output (MIMO) arrays of antenna elements, where each antenna element is capable of a degree of movement), one or more camera devices, a first set of motors to control movement of the node device, a second set of motors to control movement of the one or more antennas, an altimeter, a relative position sensor, a global positioning system (GPS) device, and/or the like. Node device 320 may communicate with CPE 310 via the communication link (e.g., based on a line of sight view between the antenna of CPE 310 and an antenna of node device 320). In some implementations, node device 320 may receive information from and/or transmit information to CPE 310, monitoring platform 330, client device 340, and/or the like, such as via network 350.

Monitoring platform 330 includes one or more devices capable of controlling a node device, such as node device 320. In some implementations, monitoring platform 330 may be designed to be modular such that certain software components may be swapped in or out depending on a particular need. As such, monitoring platform 330 may be easily and/or quickly reconfigured for different uses. In some implementations, monitoring platform 330 may receive information from and/or transmit information to node device 320, client device 340, and/or the like, such as via network 350.

In some implementations, as shown, monitoring platform 330 may be hosted in a cloud computing environment 332. Notably, while implementations described herein describe monitoring platform 330 as being hosted in cloud computing environment 332, in some implementations, monitoring platform 330 may be non-cloud-based (i.e., may be implemented outside of a cloud computing environment) or may be partially cloud-based.

Cloud computing environment 332 includes an environment that hosts monitoring platform 330. Cloud computing environment 332 may provide computation, software, data access, storage, etc. services that do not require end-user knowledge of a physical location and configuration of system(s) and/or device(s) that hosts monitoring platform 330. As shown, cloud computing environment 332 may include a group of computing resources 334 (referred to collectively as "computing resources 334" and individually as "computing resource 334").

Computing resource 334 includes one or more personal computers, workstation computers, server devices, or other types of computation and/or communication devices. In some implementations, computing resource 334 may host monitoring platform 330. The cloud resources may include compute instances executing in computing resource 334, storage devices provided in computing resource 334, data transfer devices provided by computing resource 334, etc. In some implementations, computing resource 334 may communicate with other computing resources 334 via wired connections, wireless connections, or a combination of wired and wireless connections.

As further shown in FIG. 3, computing resource 334 includes a group of cloud resources, such as one or more applications ("APPs") 334-1, one or more virtual machines ("VMs") 334-2, virtualized storage ("VSs") 334-3, one or more hypervisors ("HYPs") 334-4, and/or the like.

Application 334-1 includes one or more software applications that may be provided to or accessed by CPE 310, node device 320, and/or the like. Application 334-1 may eliminate a need to install and execute the software applications on node device 320, client device 340, and/or the like. For example, application 334-1 may include software associated with monitoring platform 330 and/or any other software capable of being provided via cloud computing environment 332. In some implementations, one application 334-1 may send/receive information to/from one or more other applications 334-1, via virtual machine 334-2.

Virtual machine 334-2 includes a software implementation of a machine (e.g., a computer) that executes programs like a physical machine. Virtual machine 334-2 may be either a system virtual machine or a process virtual machine, depending upon use and degree of correspondence to any real machine by virtual machine 334-2. A system virtual machine may provide a complete system platform that supports execution of a complete operating system ("OS"). A process virtual machine may execute a single program, and may support a single process. In some implementations, virtual machine 334-2 may execute on behalf of a user, and may manage infrastructure of cloud computing environment 332, such as data management, synchronization, or long-duration data transfers.

Virtualized storage 334-3 includes one or more storage systems and/or one or more devices that use virtualization techniques within the storage systems or devices of computing resource 334. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 334-4 may provide hardware virtualization techniques that allow multiple operating systems (e.g., "guest operating systems") to execute concurrently on a host computer, such as computing resource 334. Hypervisor 334-4 may present a virtual operating platform to the guest operating systems, and may manage the execution of the guest operating systems. Multiple instances of a variety of operating systems may share virtualized hardware resources.

Client device 340 includes one or more devices capable of receiving, generating, storing, processing, and/or providing information, such as information described herein. For example, client device 340 may include a computer (e.g., a desktop computer, a laptop computer, a tablet computer, a handheld computer, a server device, etc.), a mobile phone (e.g., a smart phone, a radiotelephone, etc.), an internet of things (IoT) device or smart appliance, or a similar device. In some implementations, client device 340 may receive information from and/or transmit information to node device 320, monitoring platform 330, and/or the like, such as via network 350.

Network 350 includes one or more wired and/or wireless networks. For example, network 350 may include a cellular network (e.g., a long-term evolution (LTE) network, a code division multiple access (CDMA) network, a 3G network, a 4G network, a 5G network (e.g., a 5G mmW network), another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the internet, a fiber optic-based network, a cloud computing network, a mesh network and/or the like, and/or a combination of these or other types of networks.

The number and arrangement of devices and networks shown in FIG. 3 are provided as one or more examples. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
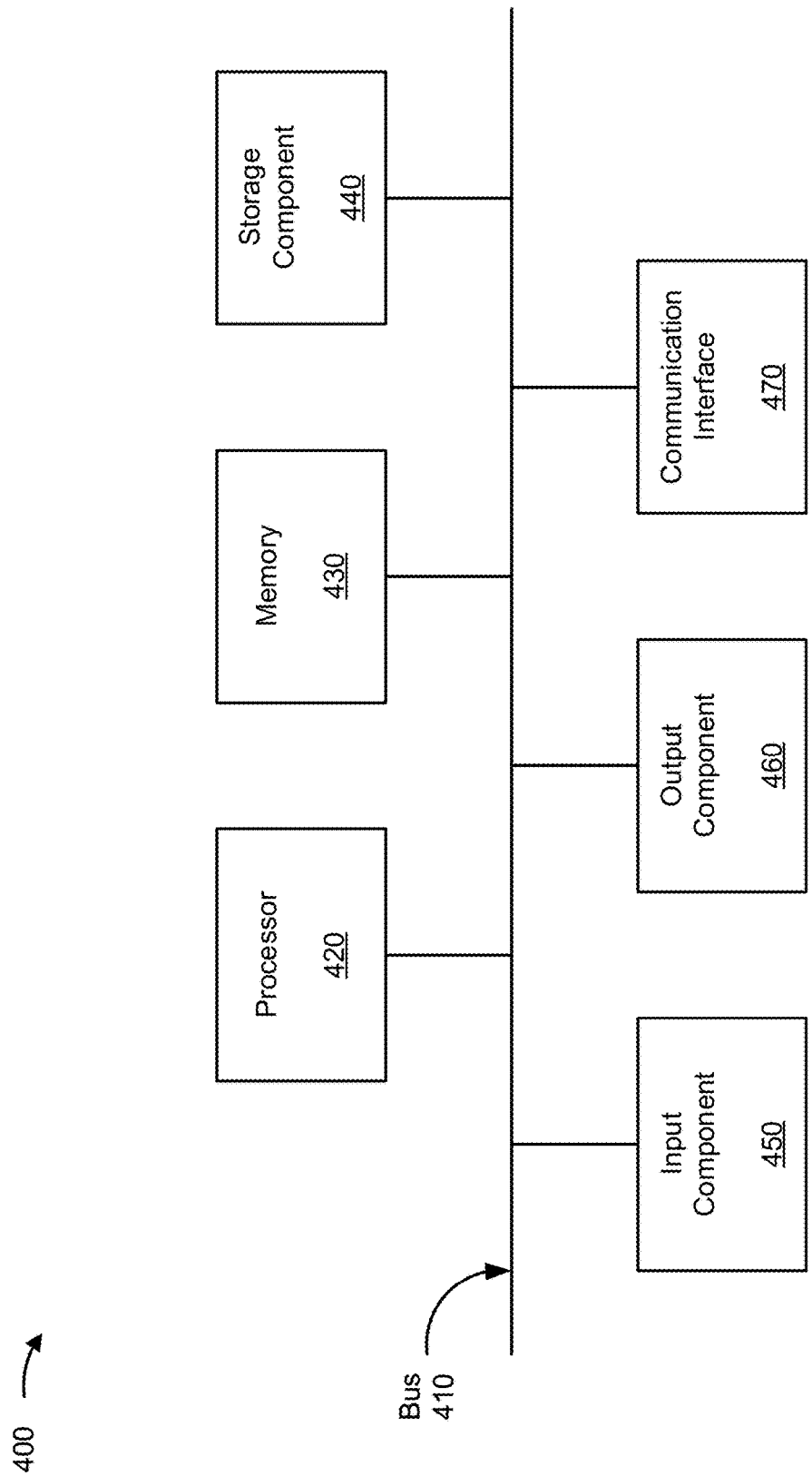
FIG. 4 is a diagram of example components of one or more devices of FIG. 3.

FIG. 4 is a diagram of example components of a device 400. Device 400 may correspond to CPE 310, node device 320, monitoring platform 330, computing resource 334, client device 340, and/or the like. In some implementations CPE 310, node device 320, monitoring platform 330, computing resource 334, and/or the like may include one or more devices 400 and/or one or more components of device 400. As shown in FIG. 4, device 400 may include a bus 410, a processor 420, a memory 430, a storage component 440, an input component 450, an output component 460, and a communication interface 470.

Bus 410 includes a component that permits communication among multiple components of device 400. Processor 420 is implemented in hardware, firmware, and/or a combination of hardware and software. Processor 420 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 420 includes one or more processors capable of being programmed to perform a function. Memory 430 includes a random access memory (RAM), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 450 includes a component that permits device 400 to receive information, such as via user input (e.g., a touch screen display, a keyboard, a keypad, a mouse, a button, a switch, and/or a microphone). Additionally, or alternatively, input component 450 may include a component for determining location (e.g., a global positioning system (GPS) component) and/or a sensor (e.g., an accelerometer, a gyroscope, an actuator, another type of positional or environmental sensor, and/or the like). Output component 460 includes a component that provides output information from device 400 (via, e.g., a display, a speaker, a haptic feedback component, an audio or visual indicator, and/or the like).

Communication interface 470 includes a transceiver-like component (e.g., a transceiver, a separate receiver, a separate transmitter, and/or the like) that enables device 400 to communicate with other devices, such as via a wired connection, a wireless connection, or a combination of wired and wireless connections. Communication interface 470 may permit device 400 to receive information from another device and/or provide information to another device. For example, communication interface 470 may include an Ethernet interface, an optical interface, a coaxial interface, an infrared interface, a radio frequency (RF) interface, a universal serial bus (USB) interface, a wireless local area network interface, a cellular network interface, and/or the like.

Device 400 may perform one or more processes described herein. Device 400 may perform these processes based on processor 420 executing software instructions stored by a non-transitory computer-readable medium, such as memory 430 and/or storage component 440. As used herein, the term "computer-readable medium" refers to a non-transitory memory device. A memory device includes memory space within a single physical storage device or memory space spread across multiple physical storage devices.

Software instructions may be read into memory 430 and/or storage component 440 from another computer-readable medium or from another device via communication interface 470. When executed, software instructions stored in memory 430 and/or storage component 440 may cause processor 420 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
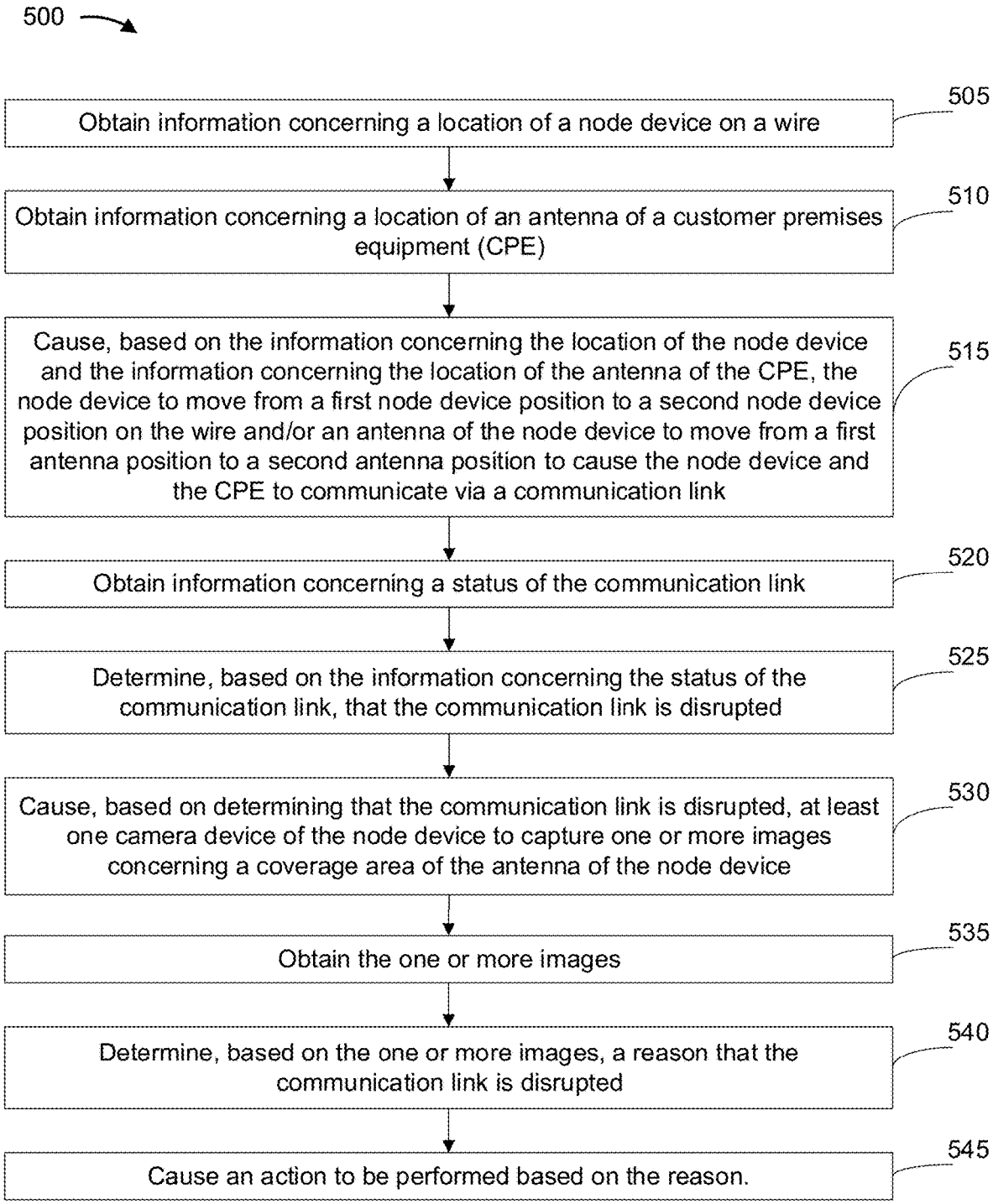
FIG. 5 is a flowchart of an example process for controlling a node device.

FIG. 5 is a flowchart of an example process 500 for controlling a node device. In some implementations, one or more process blocks of FIG. 5 may be performed by a monitoring platform (e.g., monitoring platform 330). In some implementations, one or more process blocks of FIG. 5 may be performed by another device or a group of devices separate from or including the monitoring platform, such as a CPE (e.g., CPE 310), a node device (e.g., node device 320), a client device (e.g., client device 340), and/or the like.

As shown in FIG. 5, process 500 may include obtaining information concerning a location of a node device on a wire (block 505). For example, the monitoring platform (e.g., using computing resource 334, processor 420, memory 430, storage component 440, input component 450, output component 460, communication interface 470, and/or the like) may obtain information concerning a location of a node device on a wire, as described above. The node device may include one or more antennas, one or more camera devices, a first set of motors to control movement of the node device, a second set of motors to control movement of the one or more antennas, and/or the like. The information concerning the location of the node device on the wire may include a physical location of the node device, a height of the node device, a position of the node device on the wire.

As further shown in FIG. 5, process 500 may include obtaining information concerning a location of an antenna of a CPE (block 510). For example, the monitoring platform (e.g., using computing resource 334, processor 420, memory 430, storage component 440, input component 450, output component 460, communication interface 470, and/or the like) may obtain information concerning a location of an antenna of a CPE, as described above. The information concerning the location of the antenna of the CPE may include a physical location of the antenna of the CPE, a height of the antenna of the CPE, a direction of the antenna of the CPE, and/or the like.

As further shown in FIG. 5, process 500 may include causing, based on the information concerning the location of the node device and the information concerning the location of the antenna of the CPE, the node device to move from a first node device position to a second node device position on the wire and/or an antenna of the node device to move from a first antenna position to a second antenna position to cause the node device and the CPE to communicate via a communication link (block 515). For example, the monitoring platform (e.g., using computing resource 334, processor 420, memory 430, storage component 440, input component 450, output component 460, communication interface 470, and/or the like) may cause, based on the information concerning the location of the node device and the information concerning the location of the antenna of the CPE, the node device to move from a first node device position to a second node device position on the wire and/or an antenna of the node device to move from a first antenna position to a second antenna position to cause the node device and the CPE to communicate via a communication link, as described above. The monitoring platform may determine (e.g., using a machine learning model) the second node device position and/or the second antenna position based on the information concerning the location of the node device and the information concerning the location of the antenna of the CPE. The monitoring platform may send one or more first instructions to the node device to cause the node device to move along the wire from the first node device position to the second node device position (e.g., by causing the node device to engage a first set of motors of the node device; and/or may send one or more second instructions to the node device to cause the antenna of the node device to move from the first antenna position to the second antenna position (e.g., by causing the node device to engage a second set of motors of the node device that cause the antenna of the node device to pan left or right, tilt up or down, and/or the like). The monitoring platform may cause the node device and the CPE to establish the communication link to enable the node device and the CPE to communicate via the communication link.

As further shown in FIG. 5, process 500 may include obtaining information concerning a status of the communication link (block 520). For example, the monitoring platform (e.g., using computing resource 334, processor 420, memory 430, storage component 440, input component 450, output component 460, communication interface 470, and/or the like) may obtain information concerning a status of the communication link, as described above.

As further shown in FIG. 5, process 500 may include determining, based on the information concerning the status of the communication link, that the communication link is disrupted (block 525). For example, the monitoring platform (e.g., using computing resource 334, processor 420, memory 430, storage component 440, input component 450, output component 460, communication interface 470, and/or the like) may determine, based on the information concerning the status of the communication link, that the communication link is disrupted, as described above.

As further shown in FIG. 5, process 500 may include causing, based on determining that the communication link is disrupted, at least one camera device of the node device to capture one or more images concerning a coverage area of the antenna of the node device (block 530). For example, the monitoring platform (e.g., using computing resource 334, processor 420, memory 430, storage component 440, input component 450, output component 460, communication interface 470, and/or the like) may cause, based on determining that the communication link is disrupted, at least one camera device of the node device to capture one or more images concerning a coverage area of the antenna of the node device, as described above.

As further shown in FIG. 5, process 500 may include obtaining the one or more images (block 535). For example, the monitoring platform (e.g., using computing resource 334, processor 420, memory 430, storage component 440, input component 450, output component 460, communication interface 470, and/or the like) may obtain the one or more images, as described above.

As further shown in FIG. 5, process 500 may include determining, based on the one or more images, a reason that the communication link is disrupted (block 540). For example, the monitoring platform (e.g., using computing resource 334, processor 420, memory 430, storage component 440, input component 450, output component 460, communication interface 470, and/or the like) may determine, based on the one or more images, a reason that the communication link is disrupted, as described above. The reason the communication link is disrupted may include at least one object is obstructing a line of sight view between the antenna of the CPE and the antenna of the node device, a physical location, a height, or a direction of the antenna of the CPE has changed, the antenna of the node device or the antenna of the CPE is malfunctioning, and/or the like.

In some implementations, the monitoring platform may process the one or more images using an object detection technique to identify a plurality of objects, wherein the plurality of objects includes the at least one object, and may determine, based on identifying the plurality of objects, that the at least one object is obstructing the line of sight view between the antenna of the CPE and the antenna of the node device. Additionally, or alternatively, the monitoring platform may determine that no object of the plurality of objects is obstructing the line of sight view between the antenna of the CPE and the antenna of the node device. In some implementations, the monitoring platform may process the one or more images using an object detection technique to identify the antenna of the CPE. Accordingly, the monitoring platform may determine, based on identifying the antenna of the CPE, that a physical location, a height, or an aiming direction of the antenna of the CPE has changed. Additionally, or alternatively, the monitoring platform may determine, based on identifying the antenna of the CPE, that a physical location, a height, or an aiming direction of the antenna of the CPE has not changed. Based on determining that the physical location, the height, or the aiming direction of the antenna of the CPE has not changed and that the line of sight view between the antenna of the CPE and the antenna of the node device is not obstructed, the monitoring platform may determine that the antenna of the node device and/or the antenna of the CPE is malfunctioning.

As further shown in FIG. 5, process 500 may include causing an action to be performed based on the reason (block 545). For example, the monitoring platform (e.g., using computing resource 334, processor 420, memory 430, storage component 440, input component 450, output component 460, communication interface 470, and/or the like) may cause an action to be performed based on the reason, as described above. For example, the monitoring platform may process, based on the reason, the one or more images to determine a different node device position on the wire for the node device and a different antenna position for the antenna of the node device to enable the antenna of the CPE to be in the coverage area of the antenna of the node device and may cause the node device to move to the different node device position on the wire and the antenna of the node device to move to the different antenna position. In another example, the monitoring platform may process, using a machine learning model, the one or more images to determine whether moving the node device and the antenna of the node device will restore the line of sight view between the antenna of the CPE and the antenna of the node device and may cause, based on determining that moving the node device and the antenna of the node device will restore the line of sight view between the antenna of the CPE and the antenna of the node device, the node device to move to a different node device position on the wire and the antenna of the node device to move to a different antenna position. As another example, the monitoring platform may process, using a machine learning model, the one or more images to determine whether a service technician can remove the at least one object and may send, based on determining that a service technician can remove the at least one object, one or more instructions to a client device to dispatch a service technician.

Process 500 may include additional implementations, such as any single implementation or any combination of implementations described in connection with one or more other processes described elsewhere herein.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   obtaining, by a device, information concerning a location of a node device on a wire;
   obtaining, by the device, information concerning a location of an antenna of a customer premises equipment (CPE);
   causing, by the device and based on the information concerning the location of the node device and the information concerning the location of the antenna of the CPE, the node device to move from a first node device position to a second node device position on the wire;
   causing, by the device, the node device and the CPE to communicate via a communication link,
   obtaining information concerning a status of the communication link;
   determining, based on the information concerning the status of the communication link, that the communication link is disrupted;
   causing, based on determining that the communication link is disrupted, at least one camera device of the node device to capture one or more images concerning a coverage area of the antenna of the node device;
   obtaining the one or more images;
   determining, based on the one or more images, a reason that the communication link is disrupted; and
   causing an action to be performed based on the reason.

2. The method of claim 1,
   wherein the action to be performed comprises: causing the node device to move to a different node device position on the wire, and the antenna of the node device to move to a different antenna position.

3. The method of claim 1, wherein the node device includes:
   one or more antennas;
   one or more camera devices;
   a first set of motors to control movement of the node device; or
   a second set of motors to control movement of the one or more antennas.

4. The method of claim 1, wherein the information concerning the location of the node device on the wire includes at least one of:
   a physical location of the node device;
   a height of the node device; or
   a position of the node device on the wire.

5. The method of claim 1, wherein the information concerning the location of the antenna of the CPE includes at least one of:
   a physical location of the antenna of the CPE;
   a height of the antenna of the CPE; or
   a direction of the antenna of the CPE.

6. The method of claim 1, wherein causing the node device to move from the first node device position to the second node device position on the wire comprises:
   causing the node device to move from the first node device position to the second node device position using a first set of motors of the node device; and
   causing the antenna of the node device to move from a first antenna position to a second antenna position using a second set of motors of the node device.

7. The method of claim 1, wherein causing the node device to move from the first node device position to the second node device position on the wire comprises:
   determining the second node device position based on the information concerning the location of the node device and the information concerning the location of the antenna of the CPE; and
   sending one or more instructions to the node device to cause the node device to move from the first node device position to the second node device position.

8. A device, comprising:
   one or more memories; and
   one or more processors, communicatively coupled to the one or more memories, to:
   obtain information concerning a location of a node device on a wire;
   obtain information concerning a location of an antenna of a customer premises equipment (CPE);
   cause, based on the information concerning the location of the node device and the information concerning the location of the antenna of the CPE, the node device to move from a first node device position to a second node device position on the wire to cause the node device and the CPE to communicate via a communication link;
   obtain information concerning a status of the communication link;

determine, based on the information concerning the status of the communication link, that the communication link is disrupted;

cause, based on determining that the communication link is disrupted, at least one camera device of the node device to capture one or more images concerning a coverage area of an antenna of the node device;

obtain the one or more images;

determine, based on the one or more images, a reason that the communication link is disrupted; and cause an action to be performed based on the reason.

9. The device of claim 8, wherein the one or more processors, when causing the node device to move from the first node device position to the second node device position on the wire, are to:

cause the node device to engage a set of motors of the node device to move along the wire from the first node device position to the second node device position.

10. The device of claim 8, wherein the one or more processors, when causing the node device to move from the first node device position to the second node device position on the wire, are to:

cause the antenna of the node device to pan left or right; or cause the antenna of the node device to tilt up or down.

11. The device of claim 8, wherein the reason that the communication link is disrupted includes:

an object is obstructing a line of sight view between the antenna of the CPE and the antenna of the node device;

a physical location, a height, or a direction of the antenna of the CPE has changed; or the antenna of the node device or the antenna of the CPE is malfunctioning.

12. The device of claim 8, wherein the one or more processors, when determining the reason that the communication link is disrupted, are to:

process the one or more images using an object detection technique to identify the antenna of the CPE; and determine, based on identifying the antenna of the CPE, that a physical location, a height, or an aiming direction of the antenna of the CPE has changed.

13. The device of claim 8, wherein the one or more processors, when determining the reason that the communication link is disrupted, are to:

process the one or more images using an object detection technique to identify the antenna of the CPE; and determine, based on processing the one or more images, that a line of sight view between the antenna of the CPE and the antenna of the node device is not obstructed;

determine, based on identifying the antenna of the CPE, that a physical location, a height, or an aiming direction of the antenna of the CPE has not changed; and determine, based on determining that the physical location, the height, or the aiming direction of the antenna of the CPE has not changed and that the line of sight view between the antenna of the CPE and the antenna of the node device is not obstructed, that the antenna of the node device or the antenna of the CPE is malfunctioning.

14. The device of claim 8, wherein the one or more processors, when causing the action to be performed, are to:

process, based on the reason, the one or more images to determine a different node device position on the wire for the node device and a different antenna position for the antenna of the node device to enable the antenna of the CPE to be in the coverage area of the antenna of the node device; and cause the node device to move to the different node device position on the wire and the antenna of the node device to move to the different antenna position.

15. A non-transitory computer-readable medium storing instructions, the instructions comprising:

one or more instructions that, when executed by one or more processors of a device, cause the one or more processors to:

cause, based on information concerning a location of a node device and information concerning a location of an antenna of a customer premises equipment (CPE), the node device to move from a first node device position to a second node device position on a wire;

cause, based on causing the node device to move from the first node device position to the second node device position on the wire, the node device and the CPE to communicate via a communication link;

determine, after causing the node device and the CPE to communicate via the communication link, that the communication link is disrupted;

cause, based on determining that the communication link is disrupted, at least one camera device of the node device to capture one or more images concerning a coverage area of an antenna of the node device;

determine, based on the one or more images, that a line of sight view between the antenna of the CPE and the antenna of the node device is obstructed by at least one object; and cause an action to be performed to address the at least one object.

16. The non-transitory computer-readable medium of claim 15, wherein the one or more instructions, that cause the one or more processors to cause the node device to move from the first node device position to the second node device position on the wire, cause the one or more processors to:

process, using a machine learning model, the information concerning the location of the node device and the information concerning the location of the antenna of the CPE to determine the second node device position; and send, to the node device, one or more instructions that indicate that the node device is to move to the second node device position.

17. The non-transitory computer-readable medium of claim 15, wherein the one or more instructions, that cause the one or more processors to determine that the line of sight view between the antenna of the CPE and the antenna of the node device is obstructed by the at least one object, cause the one or more processors to:

process the one or more images using an object detection technique to identify a plurality of objects,
 wherein the plurality of objects includes the at least one object; and determine, based on identifying the plurality of objects, that the at least one object is obstructing the line of sight view between the antenna of the CPE and the antenna of the node device.

18. The non-transitory computer-readable medium of claim 15, wherein the one or more instructions, that cause the one or more processors to cause the node device and the CPE to communicate via the communication link, cause the one or more processors to:

cause the node device and the CPE to establish the communication link.

19. The non-transitory computer-readable medium of claim 15, wherein the one or more instructions, that cause the one or more processors to cause the action to be performed to address the at least one object, cause the one or more processors to:
- process, using a machine learning model, the one or more images to determine whether a service technician can remove the at least one object; and
- send, based on determining that a service technician can remove the at least one object, one or more instructions to a client device to dispatch a service technician.

20. The non-transitory computer-readable medium of claim 15, wherein the one or more instructions, that cause the one or more processors to cause the action to be performed to address the at least one object, cause the one or more processors to:
- process, using a machine learning model, the one or more images to determine whether moving the node device and the antenna of the node device will restore the line of sight view between the antenna of the CPE and the antenna of the node device; and
- cause, based on determining that moving the node device and the antenna of the node device will restore the line of sight view between the antenna of the CPE and the antenna of the node device, the node device to move to a different node device position on the wire and the antenna of the node device to move to a different antenna position.

\* \* \* \* \*